United States Patent Office 3,024,663
Patented Mar. 13, 1962

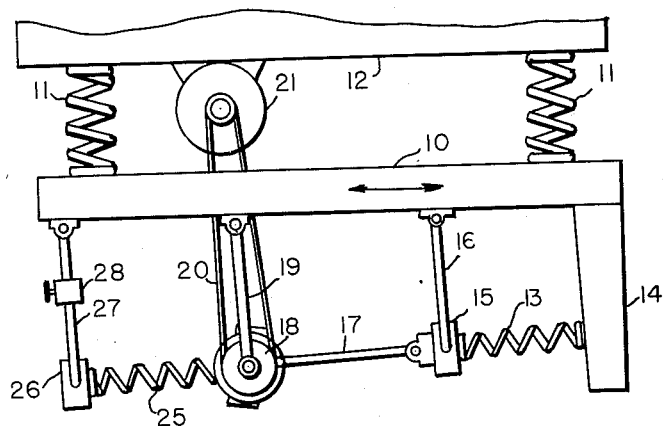
Fig. I
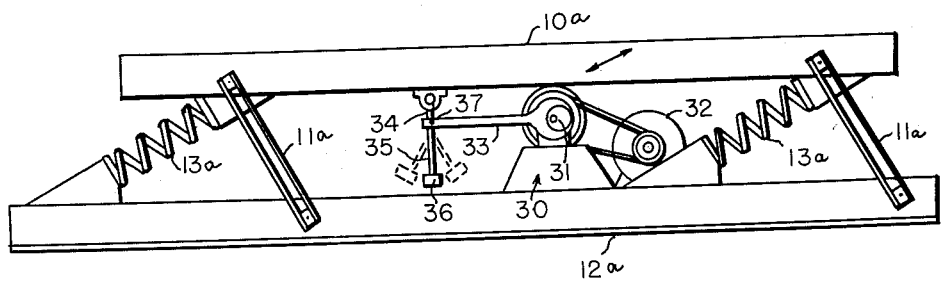
Fig. II
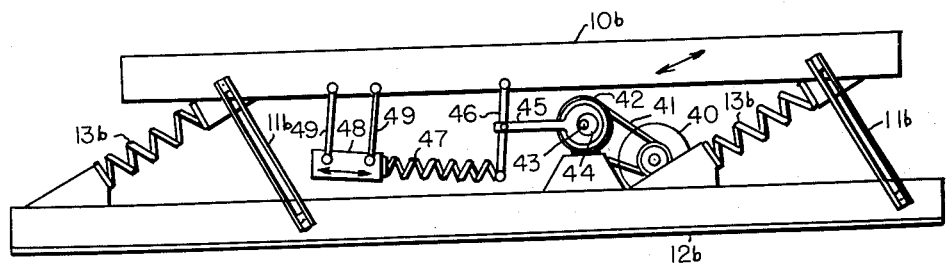
Fig. III

3,024,663
TUNED ABSORBER FOR VIBRATORY DRIVE
Robert M. Carrier, Jr., and John M. Morris, Louisville, Ky., assignors, by mesne assignments, to Chain Belt Company, Milwaukee, Wis., a corporation of Wisconsin
Filed Sept. 30, 1957, Ser. No. 687,053
8 Claims. (Cl. 74—61)

This invention relates to drives for vibratory apparatus and in particular to drive mechanism employing a tuned vibration absorber which acts as a force reaction point for a portion of the drive of a vibratory mechanism.

One of the difficulties encountered when a fixedly positioned positive amplitude vibration exciter is used with a resonant vibratory apparatus is that the force that must be transmitted from the exciter to the vibratory mechanism during starting and stopping is many times the force required to maintain the desired amplitude of vibration during operation at or near the resonant frequency of the vibratory apparatus. It was therefore necessary to design the vibration exciter with heavy components to withstand these high forces at starting and stopping although the equipment was operated most of the time at much lower forces.

The principal object of this invention is to provide a vibratory drive for a vibratory apparatus which is arranged so that a positive amplitude exciter provides small amplitudes of vibration at speeds removed from the operating speed and such that the amplitude transmission ratio is substantially one to one corresponding to direct coupling at the operating speed.

Another object of the invention is to provide a coupling system including a tuned vibration absorber between a positive amplitude vibration exciter and a resonant vibratory structure which coupling is yieldable at frequencies other than the operating speed and which is substantially nonyielding at the operating speed.

An ancillary object of the invention is to provide a structure employing a tuned vibration absorber in which a resilient element of the absorber serves also as a support for the mass member of the absorber.

More specific objects and advantages are apparent from the following description of several forms of the invention.

According to the invention the force transmission path from a positive amplitude vibration exciter to a member to be vibrated is arranged to have a force reaction point and vibration of such reaction point is opposed or minimized by a tuned vibration absorber connected to such reaction point.

Preferred embodiments of the invention are illustrated in the accompanying drawings.

In the drawings:

FIGURE I is a diagrammatic illustration of one form of vibratory conveyor in which a positive amplitude vibration exciter of small mass is arranged to drive an inertial weight resiliently coupled to the vibratory member and the positive amplitude exciter is stabilized in space by a tuned vibration absorber attached to it.

FIGURE II is a schematic elevation of a vibratory conveyor in which a tuned vibration absorber is incorporated in a lever forming part of the force transmission path from a positive amplitude exciter to a resiliently mounted conveyor.

FIGURE III is a schematic side elevation of a conveyor using another form of tuned vibration absorber for stabilizing the reaction point of the force transmission system.

These specific figures and the accompanying description are intended merely to illustrate the invention and not to impose limitations on its scope.

In the structure shown in FIGURE I, which is the same as the structure shown in FIGURE XI of our copending application Serial No. 331,714, filed January 16, 1953, now Patent No. 2,947,181, a member 10 that does work by vibration is resiliently supported on vibration isolating springs 11 from a base or framework 12. Vibratory force is applied to the member 10 through vibration exciter spring 13 that is coupled between an extension 14 of the member 10 and a tuned exciter weight 15. The exciter weight 15 is guided by links 16 and is connected through a connecting rod 17 to an eccentric 18 journaled on the lower end of depending arms 19 that are hinged to the member 10. The eccentric 18 is driven by a belt 20 connected to a motor 21 carried on the base 12.

In order that the eccentric 18 and connecting rod 17 may apply a vibratory force to the exciter member 15 it is necessary that the eccentric shaft of the lower end of the depending arms 19 in which it is journaled and which constitutes a reaction point in the force transmission path to be restrained from vibration. Otherwise the eccentric and the strut 19 merely vibrate back and forth without imparting substantial motion to the exciter member 15. To hold the eccentric 18 or its supporting arms 19 substantially stationary in space a tuned vibration absorber comprising an absorber spring 25 and absorber mass 26 are coupled to the eccentric shaft 18. Furthermore, the absorber mass 26 is carried on the lower end of a hinged strut 27 that guides it along a path generally parallel to the length of the member 10. A weight 28 slidably mounted on the strut 27 may be moved up or down to adjust the effective magnitude of the mass 26.

In this arrangement as the motor 21 is started and is operating at low speed the eccentric 18 merely moves to and fro moving the absorber spring and mass 25 and 26 with it. The exciter mass 15 remains substantially quiescent under this condition since there is not sufficient force applied to it to cause it to vibrate relative to the member 10. As the operating speed is increased and approaches the resonant frequency of the system comprising the exciter mass 15, spring 13 and member 10 the member 15 vibrates with substantial amplitude. To supply the force required to maintain such vibration the absorber comprising the spring 25 and the mass 26 which is tuned to the same frequency also builds up a resonant vibration with the mass 26 moving through a considerable distance. The force transmitted from the mass 26 through the spring 25 which is elongated or compressed according to the phase of the motion applies a reaction force to the lower end of the arm 19 or eccentric 18 thus supplying a reaction force so that the eccentric 18 in turn may transmit force through the connecting rod 17 to the exciter member 15. At the working speed the exciter member 15 is driven to an amplitude corresponding to the stroke of the eccentric 18 which constitutes a positive amplitude vibration exciter. The member 10 including its rigid extension 14 vibrates at a lesser amplitude and in phase opposition to the exciter member 15 the amplitudes being determined by the ratio of the masses of the two members. At the same time the tuned absorber mass 26 vibrates in such phase and amplitude that the force transmitted through the spring 25 is at all times equal and opposite to the force transmitted through the connecting rod 17. As long as this condition is maintained the lower end of the strut 19 carrying the eccentric 18 remains substantially motionless in space.

At speeds remote from the operating speed the force reaction of the vibration absorber or vibratory absorber decreases quite rapidly so that the eccentric 18 on the lower end of the strut 19 may vibrate in space thus reducing the amplitude of the force transmitted to the exciter member 15. Thus in this system as the motor 21 is started and brought up to speed the eccentric itself first oscillates at substantial amplitude corresponding to its stroke and then, as the operating speed is approached, the absorber builds up its vibration and supplies its reaction force to stabilize the eccentric and thus build up the vibration in the exciter member 15 and member 10 to be vibrated. At speeds above this resonant or operating speed the vibration absorber 25, 26 becomes, in effect, a spring tending to hold the eccentric in place and because of the lack of resonance the member 26 becomes more or less quiescent and the eccentric again can vibrate at substantial amplitude. The net effect of the system is that the maximum amplitude of motion of the exciter member 15 is determined by the eccentricity of the eccentric 18 and cannot build up to destructive amplitudes as may occur if an eccentric weight is used instead of the eccentric 18 and tuned absorber 25, 26.

While the system just described is satisfactory for some types of operation a simpler system may be constructed by eliminating the vibration exciter 15 and its coupling spring 13 and instead using a coupling spring extending from the member to be vibrated directly to the base or foundation. Such an arrangement is illustrated in FIGURE II in which a member 10a that does work by vibration is supported on leaf springs 11a connected to a base 12a. The base 12a may be either rigidly mounted on a foundation or may be of substantial mass and be carried on vibration isolating mountings of rubber or steel springs. A coupling spring or springs 13a are connected between the member 10a and the base 12a and cooperate with the member 10a to form a vibratory system having a resonant frequency. A positive amplitude vibration exciter 30 is mounted on the base 12a and includes an eccentric 31 that is driven by a motor 32 to drive a connecting rod 33 through a stroke of fixed amplitude at a frequency corresponding to the speed of the motor 32. The connecting rod 33 is pivotally connected to an intermediate point of a lever 34 the upper end of which is pivotally connected to the vibrated member 10a. A lower arm 35 of the lever 34 constitutes a spring that carries a mass 36 at its lower end. The spring arm 35 of the lever 34 and mass 36 constitute a tuned vibration absorber which in this case supplies a reacting moment to the lever 34 about its connection 37 to the connecting rod 33 to oppose the tendency of the lever to rock with the movement of the connecting rod 33.

In this arrangement when the motor 32 is first started or is operating at low speed the connecting rod 33 is driven through its normal stroke of fixed or positive amplitude but because of the low speed and resulting small inertia force of the weight 36 the lever 34 oscillates through a range of travel sufficient to permit the conveyor deck or member 10a to remain substantially stationary. As the speed of the motor is increased toward the normal operating speed the spring arm 35 and mass 36 partake of a resonant vibration and when the operating speed is reached the mass 36 vibrates through a sufficient distance and the proper phase to supply a moment to the lever 34 about the pivot 37 so as to transmit force from the connecting rod 33 to the member 10a to be vibrated without permitting substantial rotary motion of the upper end of lever 34 about its connection point 37. The amplitude of motion of the vibration absorber mass 36 varies according to the load forces overcome by the work member of vibratory member 10a. If the member 10a and the springs 13a are properly tuned to the resonant frequency of the absorber 35, 36 and the losses are small the member 10a may be driven to an amplitude of vibration corresponding to the stroke of the connecting rod 33 without producing appreciable vibratory motion of the absorber. However, if there are losses in the system or the tuning is not exact the absorber 36 vibrates at whatever amplitude is required to apply sufficient moment to the lever arm 34 to prevent it from moving relative to the connecting rod 33. In this arrangement the connecting rod 33 needs supply only sufficient force to maintain the vibration of a conveyor 10a and when the motor 32 is deenergized at the end of a conveying operation and slows down the resilient spring arm 35 and mass 36 absorb whatever differential motion is required to prevent a substantial force transmission in excess of the normal working forces from the connecting rod 33 to the member 10a.

A tuned vibration absorber similar to that shown in FIGURE I may also be arranged in a system somewhat similar to that shown in FIGURE II. FIGURE III shows such a combination. In this figure a conveyor deck 10b, representative of a member that performs work by vibration, is supported and guided on a plurality of leaf springs 11b that are erected from a base 12b and extend in a direction normal to the desired vibratory motion or vibratory path of the member 10b. As before the base 12b may be either rigidly mounted on a foundation or supported on vibration isolating springs. In the latter case it is desirable that the base be heavy relative to the mass of the conveyor 10b. A pair of helical springs 13b are arranged between the member 10b and the base 12b and cooperate with these members to form a resonant system that has a resonant frequency substantially at the operating speed of the system.

Power for keeping the system in vibration is supplied by a motor 40 that is coupled through a belt 41 and pulley 42 to drive a shaft 43 turning an eccentric 44 for oscillating a connecting rod 45. The connecting rod is coupled to a lever 46 an upper end of which is pivotally attached to the conveyor 10b. The lower end of the lever is pivotally connected to a tuned vibration absorber spring 47 that cooperates with a vibration absorber mass 48 supported on a pair of struts 49 depending from the conveyor 10b. As shown in FIGURE III the connecting rod 45 is pivotally attached to an intermediate point of the lever 46. Other classes of lever may be employed, i.e. the absorber may be located above the conveyor deck 10b so that the intermediate point of the lever is attached to the conveyor deck and the connecting rod 45 pivotally connected to one end and the absorber to the other end.

In this arrangement the lower end of the lever 46 constitutes a reaction point against which forces are applied corresponding to forces applied to the conveyor deck 10b. If the reaction point is free to move, i.e., is weakly restrained, the positive amplitude drive provided by the eccentric 44 and connecting rod 45 produces a large motion of the reaction point and very little motion of the conveyor 10b. This is the condition prevailing during starting and stopping when the motor is operating at less than its normal operating speed. At these low speeds of operation the absorber is not tuned to absorb the vibration of the reaction point and thus the mass 48 and spring 47 merely move with the reaction point thereby minimizing or reducing the force that can be transferred to the conveyor.

As the operating speed is approached, the amplitude of vibration of the absorber mass 48 increases and at resonance it increases to such an amount that the vibratory forces transmitted through the spring 47 to the lever 46 hold the lower end of the lever 46 substantially stationary in space. Under this condition the conveyor deck 10b is driven at a positive amplitude of vibration corresponding to the stroke of the eccentric driven connecting rod 45 and the ratio of the lever 46. This represents the maximum motion of the conveyor 10b that can be obtained in the system. At frequencies of operation remote from the operating speed where the tuned absorber is no longer in tune with the frequency of the system the absorber supplies much smaller spring force to the lever 46 and hence the lever may oscillate through a considerable amplitude to minimize the maximum force that can be transmitted from the eccentric to the conveyor.

In each of the embodiments illustrated the system includes a reaction point in a force transmission system which reaction point is coupled to a tuned vibratory absorber that operates to minimize the motion or stabilize the motion of the reaction point at the operating speed and permit relatively large motion of the reaction point at other speeds such as during starting and stopping. In this manner a substantially constant amplitude vibratory generator is provided without generating the excessive forces that would be produced in overcoming the spring force of the coupling springs 13, 13a or 13b during starting and stopping if a positive drive were used between the member 10 and the eccentric.

Various modifications in details of construction may be made without losing the advantages of the automatic control of the amplitude of the force applied to the vibratory member or the work member to be vibrated.

Having described the invention, we claim:

1. In a device for performing work by vibration, in combination, a member that performs work by vibration, a second member, resilient means coupling said members and forming with said members a vibratory system having a natural frequency at a selected operating frequency, a positive amplitude vibration exciter operatively supported from one of the members, and drive means operatively coupled to said exciter for transmission of force to said work member, said drive means including a tuned assembly comprising a mass and a resilient member having a natural frequency generally equal to the operating frequency at which its force transmission is a maximum.

2. In a device for performing work by vibration, in combination, a work member to be vibrated, resilient means supporting the work member and forming with the work member a vibratory system, a positive amplitude vibration exciter, support means for the exciter, a differential force transmitting system connecting the exciter to the work member, and a tuned vibration absorber connected to the differential transmitting system for substantially immobilizing a portion of said system at the operating speed of the exciter.

3. In a device for performing work by vibration, in combination, a work member to be vibrated, resilient means that support the work member and that form with the work member a vibratory system having a natural frequency approximately equal to a selected operating frequency, a positive amplitude vibration exciter, support means for the exciter, a force transmitting mechanism connecting the exciter and the work member, and a resonant system having a natural frequency generally equal to the operating frequency included in said force transmitting mechanism adapted to increase the force transmission of the mechanism as the resonant frequency of the resonant system is approached.

4. In a device for performing work by vibration, in combination, a work member to be vibrated, a second member, resilient means interconnecting the members and forming with the members a vibratory system having a natural frequency generally equal to a selected operating frequency, a positive amplitude vibration exciter supported from one of the members, a force transmission mechanism connecting the exciter to at least one of the members, and a tuned absorber that is resonant at said operating frequency cooperating with said mechanism and exciter adapted to increase the force transmitted by the mechanism as the resonant frequency of the system is approached.

5. In a device for performing work by vibration, in combination, a work member to be vibrated, a second member, resilient means supporting one member from the other member and forming with the members a vibratory system having a natural frequency generally equal to a selected operating frequency, a positive amplitude vibration exciter, means supporting the exciter from the second member, a force transmitting mechanism connecting the exciter to the work member, said mechanism including a lever arm extending generally transversely of the line of force transmission, and a resonant system that is resonant at the operating frequency connected to said lever arm to inhibit rotation of the arm at the operating speed of the exciter.

6. In a device for performing work by vibration, in combination, a work member to be vibrated, a second member, resilient means supporting one member from the other member and forming with the members a vibratory system, a positive amplitude vibration exciter, means supporting the exciter, a force transmitting mechanism including a lever connecting the exciter to the work member, said lever having a resilient arm, and a mass that is carried on the resilient arm and that forms with the arm a vibratory assembly having a resonant frequency at the operating speed of the exciter.

7. In a device for performing work by vibration, in combination, a work member to be vibrated, a second member, resilient means connecting the members and forming with the members a vibratory system that is resonant at a selected operating frequency, a positive amplitude vibration exciter, support means for the exciter, a force transmitting mechanism connecting the exciter to the work member, said mechanism having a movable reaction point against which forces generally proportional to the force transmitted to the work member are applied, and a mass resiliently connected to said reaction point and arranged to be resonant substantially at the operating speed of the exciter to oppose motion of said reaction point.

8. In a device for performing work by vibration, in combination, a work member to be vibrated, a second member, resilient means connecting the members and forming with the members a vibratory system, a positive amplitude vibration exciter, a force transmitting mechanism connecting the exciter to one of the members, said mechanism having a reaction point against which forces generally proportional to the transmitted force are applied, a mass yieldably supported from one of said members, and a spring connecting said mass to said reaction point, said mass and spring being resonant substantially at the operating speed of the exciter.

References Cited in the file of this patent

UNITED STATES PATENTS

| 1,720,574 | Schieferstein | July 9, 1929 |
| 1,737,772 | Schieferstein | Dec. 3, 1929 |
| 1,774,769 | Spear | Sept. 2, 1930 |
| 2,358,876 | Overstrom | Sept. 26, 1944 |
| 2,636,719 | O'Connor | Apr. 28, 1953 |
| 2,645,837 | Robbins | July 21, 1953 |
| 2,700,472 | Carrier et al. | Jan. 25, 1955 |